(12) United States Patent
Griggs

(10) Patent No.: US 7,097,191 B2
(45) Date of Patent: Aug. 29, 2006

(54) ADJUSTABLE KICKSTAND WITH REINFORCED PARKING POSITION LOCK

(76) Inventor: Terrance M. Griggs, 2511 Bachman Valley Rd., Manchester, MD (US) 21102

( * ) Notice: Subject to any disclaimer, the term of this patent is extended or adjusted under 35 U.S.C. 154(b) by 0 days.

(21) Appl. No.: 10/905,688

(22) Filed: Jan. 17, 2005

(65) Prior Publication Data
US 2006/0157625 A1    Jul. 20, 2006

(51) Int. Cl.
  B62H 1/02       (2006.01)
(52) U.S. Cl. ............ 280/301; 280/293; 280/298; 248/188.9
(58) Field of Classification Search .......... 248/188.9, 248/188.8; 280/295, 301, 303, 304, 291, 280/293
See application file for complete search history.

(56) References Cited

U.S. PATENT DOCUMENTS

| 626,239 | A | * | 6/1899 | Lindstrom | 280/301 |
|---|---|---|---|---|---|
| 3,591,202 | A | * | 7/1971 | Larsen et al. | 280/303 |
| 3,712,640 | A | | 1/1973 | Shipman et al. | |
| 4,169,687 | A | * | 10/1979 | Schull | 403/109.3 |
| 4,417,746 | A | | 11/1983 | Baron | |
| 4,432,562 | A | | 2/1984 | Cline | |
| 4,445,705 | A | | 5/1984 | Hayashi et al. | |
| 4,494,764 | A | * | 1/1985 | Kelley | 280/293 |
| 4,580,804 | A | * | 4/1986 | Weber | 280/300 |
| 4,768,800 | A | | 9/1988 | Johns | |
| 4,817,977 | A | | 4/1989 | Bookbinder | |
| 4,986,557 | A | * | 1/1991 | Muszynski | 280/298 |
| 5,067,739 | A | | 11/1991 | Kuan | |
| 5,293,786 | A | | 3/1994 | Hsu | |
| 5,388,848 | A | * | 2/1995 | Silva et al. | 280/300 |
| 5,607,173 | A | | 3/1997 | Lai | |
| 5,979,269 | A | * | 11/1999 | Su-Chen | 74/564 |
| 6,494,423 | B1 | | 12/2002 | Ruth | |
| 6,502,844 | B1 | | 1/2003 | Winland | |
| 6,648,357 | B1 | * | 11/2003 | Hotch | 280/301 |

* cited by examiner

Primary Examiner—Anita M. King
(74) Attorney, Agent, or Firm—Rosenberg, Klein & Lee

(57) ABSTRACT

An adjustable kickstand is constructed from a fixed kickstand body (110) and an extendable leg (150). The extendable leg (150) is effectively lengthened by the use of at least one spacing element (120a–120e). When at the proper length, the kickstand is mounted to a vehicle so as to prop the vehicle up at a predetermined angle, while providing sufficient force on a support foot (152) on a distal end of extendable leg (150) to prevent slippage on a parking surface.

19 Claims, 6 Drawing Sheets

ADJUSTABLE KICKSTAND WITH REINFORCED PARKING POSITION LOCK

FIELD OF THE INVENTION

The invention described herein is related to an apparatus for propping upright a land vehicle when not in use. Specifically, the invention relates to kickstands. More specifically, the present invention relates to kickstands which include locking mechanisms operable to prevent accidental retraction of the stand from a parking position.

BACKGROUND OF THE INVENTION

As is widely known, a kickstand is a device for propping a vehicle, which would otherwise fall over, in an upright position, and which can be retracted for stowage when the vehicle is to be operated. Thus, it is desirable for a kickstand to be securely lockable in a parking position, while, at the same time, being easily retracted into its stowage position. For many kickstand configurations, these functions are seemingly mutually exclusive, i.e., the more immovable the kickstand is from its locked parking position, the more difficult it is to retract the kickstand into its stowage position.

The prior art is replete with stands for vehicles that simultaneously provide secure locking in the parking position and retract in a manner that is easy to operate. Such a vehicle stand is disclosed in U.S. Pat. No. 4,817,977 issued to Bookbinder. The Bookbinder stand is not a kickstand, per se, i.e., positioned into the parking and stowage positions by an operator's foot, but rather utilizes a motor-driven screw jack to extend and retract a longitudinally extending leg. The leg is coupled to a reversible motor through a limited torque coupling which terminates the extending operation upon firm contact with the parking surface.

Whereas, the stand of Bookbinder is convenient to operate and is reasonably secure against accidental retraction, the mechanism is extremely complex and involves an electric motor. Not only do these factors weigh heavily on the cost of the stand, but the vehicle may also be rendered unsafe to operate should an electrical failure occur in the circuit of the stand while the stand is in its extended parking position. The potential problems encountered when using electrically driven stands are avoided entirely through the use of simple, mechanically operated kickstands. Moreover, simple kickstands are much less expensive than their electrically operated counterparts and are much easier to install.

A simpler kickstand, which also implements a locking mechanism, is disclosed in U.S. Pat. No. 6,494,423 issued to Ruth. In Ruth, each of a plurality of steel balls is motivated by gravity in and out of a corresponding recess formed in an extendable leg. When the kickstand is in the stowage position, the steel ball falls back into its recess thereby disengaging from a recess formed in an outer member of the kickstand. When the kickstand is to be used for parking, the operator rotates the kickstand towards the ground, whereby the plurality of steel balls fall, by the influence of gravity, towards the open end of their respective recesses and against the outer member. The operator may then adjust the length of the kickstand by extending the extendable leg from the outer member, whereby one of the steel balls engages with the recess formed therein. The applied pressure of the vehicle weight on the steel ball through the recess of the outer member maintains the selected length.

Ruth uses gravitational forces to reinforce the locked relationship between the extendable leg and the outer member to prevent longitudinal retraction of the stand, but does not securely lock the kickstand in the parking position. There are no reinforcing mechanisms to inhibit an accidental rotation of the kickstand towards the stowage position. As such, if the vehicle were to be "bumped" from the rear, it is possible for the kickstand to collapse, which, in the case of vehicles such as motorcycles, may result in substantial damage.

In light of the shortcomings of the prior art, the need is felt for a kickstand with a reinforced parking position locking mechanism, providing thereby a stable support for even heavy vehicles, yet of a simple, easily installed construction.

SUMMARY OF THE INVENTION

To overcome the shortcomings of the prior art, the present invention is a kickstand which has a locking mechanism which is reinforced by the weight of the supported vehicle. The kickstand includes a fixed kickstand body having first and second internal chambers at opposing ends thereof, where the first chamber is separated from the second chamber by a support wall having formed therein a longitudinally extending aperture. An extendable leg is slidably received against a bias in the second chamber of the fixed kickstand body. The kickstand may be rotated about a pivot into respective parking and stowage positions. The pivot is constructed of a fixed pivot member and a rotatable pivot member, where the rotatable member includes a detent catch. A distal end of the detent catch engages in one of a plurality of recessed detent stops formed on the fixed pivot member. A connecting rod is mechanically coupled to the extendable leg and extends through the aperture in the support wall into the first internal chamber of the fixed kickstand body. The connecting rod is then mechanically coupled to the detent catch. When the vehicle is propped by the kickstand, its weight is transferred through a detent stop corresponding to the parking position, to the detent catch and then to the parking surface through the extendable leg.

In another aspect, the present invention is an adjustable kickstand having a first member and a second member relatively extendable from the first member. The first member includes a first internal chamber longitudinally formed therein into which a proximal end of the second member is inserted and is coupled to the first member. Interposed between the proximal end of the second member and a wall of the internal chamber of the first member is a resilient member, such as a spring, and at least one spacing member. The at least one spacing member effectively lengthens the longitudinal extent of the second member. When properly installed, a clamping device will attach the kickstand to a vehicle and spacers are added onto the second member until a footpad at the distal end thereof is in contact with the parking surface while the vehicle is supported upright at a predetermined tilt.

DETAILED DESCRIPTION OF PREFERRED EMBODIMENTS

Figure 1:
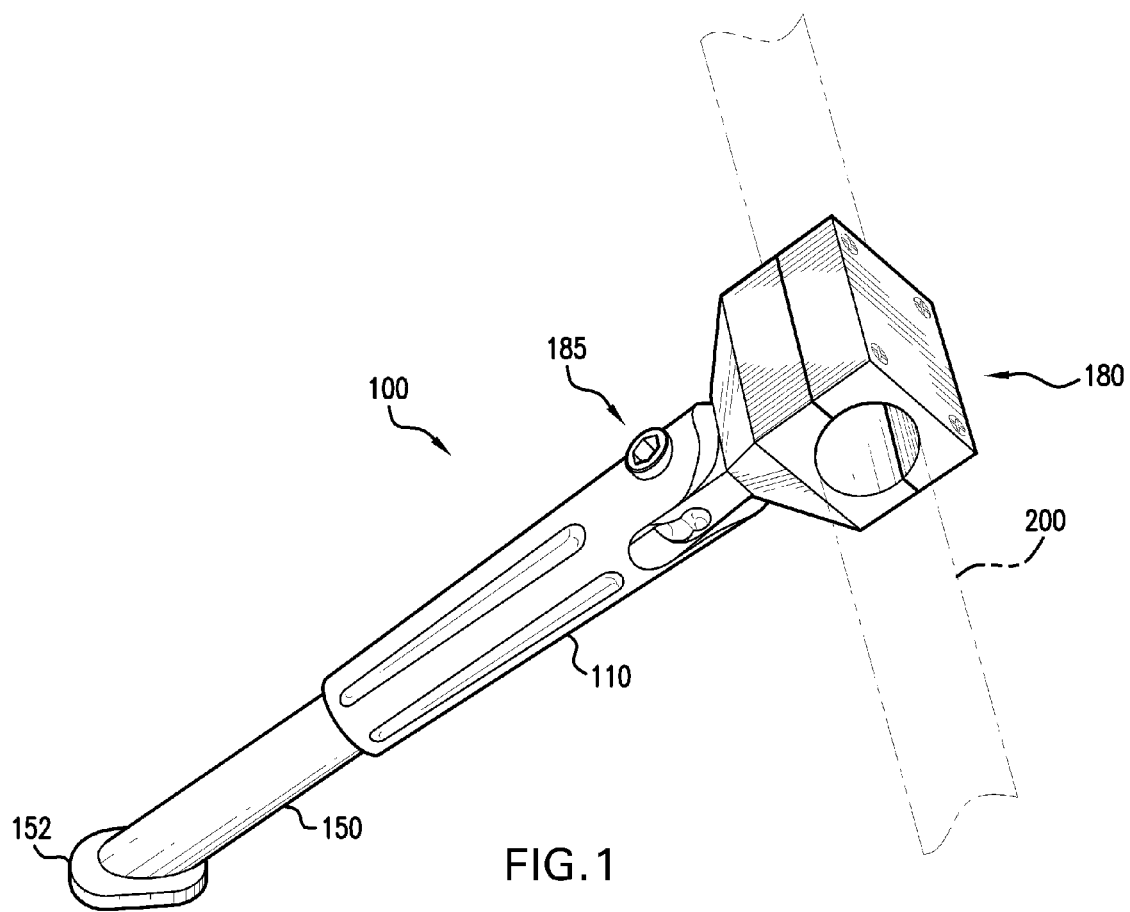
FIG. 1 is an illustration of the adjustable kickstand of the present invention.

Referring to FIG. 1, there is shown in overall view an exemplary embodiment of the adjustable kickstand of the present invention. As is shown in the Figure, the kickstand 100 is mechanically coupled to a frame member 200 of a vehicle by clamping means 180. Note that while clamping means 180 is illustrated to conform to the circular cross-section of frame member 200, it should be clear that other general attachment configurations exist that fall within the scope of the present invention.

In accordance with the objects of the present invention, certain embodiments thereof include a fixed kickstand body 110 and an extendable leg 150. Kickstand 100 is in contact with the parking surface at support foot 152 which is mechanically coupled to the distal end of extendable leg 150.

Figure 2:
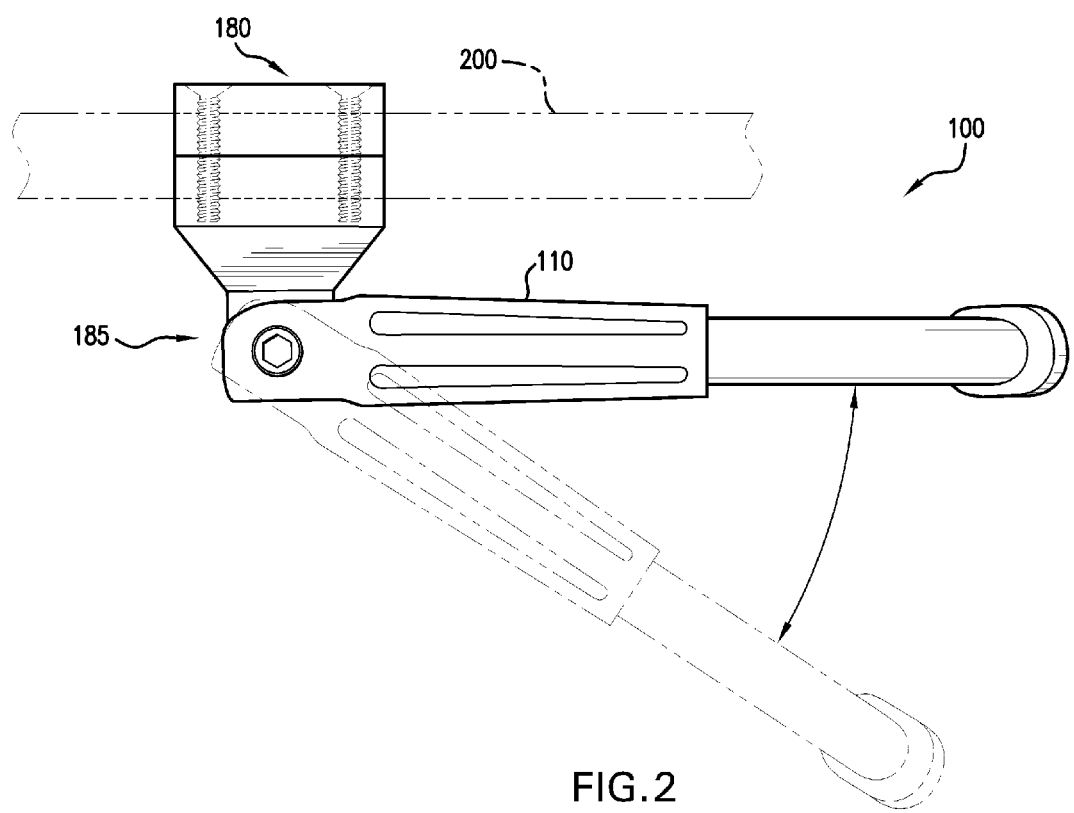
FIG. 2 is an illustration of the stowage mechanism of the kickstand of the present invention.

In similar operation to kickstands of the prior art, kickstand 100 is operable via pivoting means 185 to be stowed when not in use for stabilizing the vehicle. The stowage of kickstand 100 is illustrated in FIG. 2.

Figure 3A:
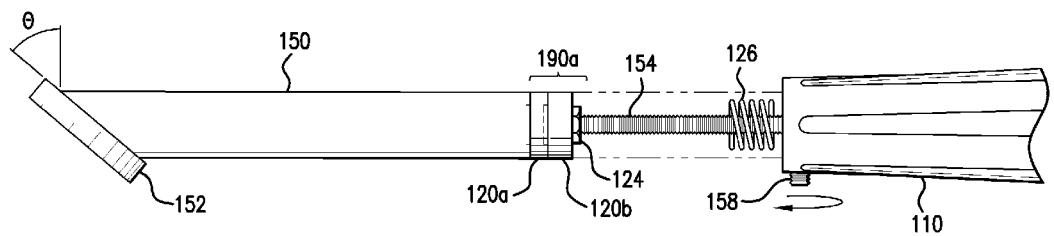
FIGS. 3A–3B are illustrations of the length adjustment of the present invention.
Figure 3B:
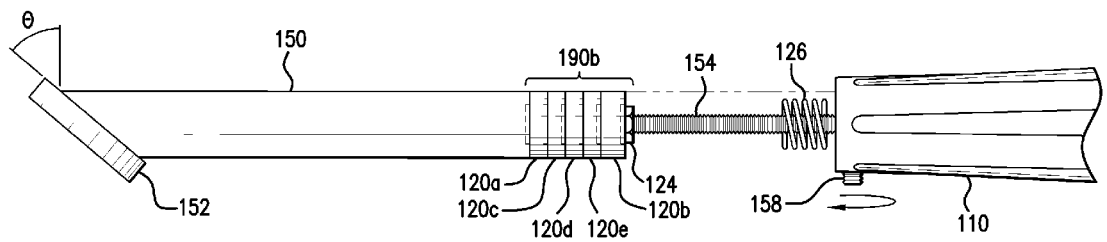

Certain features of the present invention are shown in the exemplary embodiment of FIG. 3A and FIG. 3B. As is shown in FIG. 3A, which is a partially disassembled view of adjustable kickstand 100, extendable leg 150 is effectively lengthened by extension means 190a. In certain embodiments, extension means 190a includes a plurality of spacer elements 120a–120b stacked at a proximal end of extendable leg 150. The plurality of spacing elements 120a–120b are retained by lock nut 124 threaded onto a threaded portion of connecting rod 154. A spring 126 is placed adjacent to extension means 190a and the proximal end of extendable leg 150 is inserted into a chamber of fixed body 110. Extendable leg 150 is retained in a proper rotational position via set screw 158, as will be discussed further below.

Support foot 152 is attached at a distal end of extendable leg 150. In certain embodiments of the present invention, support foot 152 is permanently fixed to extendable leg 150 in single piece formation therewith. When so attached, support foot is disposed at a predetermined angle θ with respect to extendable leg 150. When adjustable kickstand 100 is properly installed with clamping means 180 attached to a frame member of the vehicle and the vehicle is at a predetermined tilt angle θ, support foot 152 should be in contact with, and parallel to, the parking surface. To achieve this configuration, extendable leg 150 may require extension. An exemplary extended arrangement is shown in FIG. 3B, wherein extension means 190b includes additional spacing elements 120c–120e, effectively extending extendable leg 150 as needed. The spacing elements, such as spacers 120a–120e of spacing means 190a and 190b, are, in certain embodiments, interlocked and sized to match the interior dimensions of the receiving chamber of fixed body 110. This arrangement provides a stable, non-deformable extension to kickstand 100.

Figure 4:
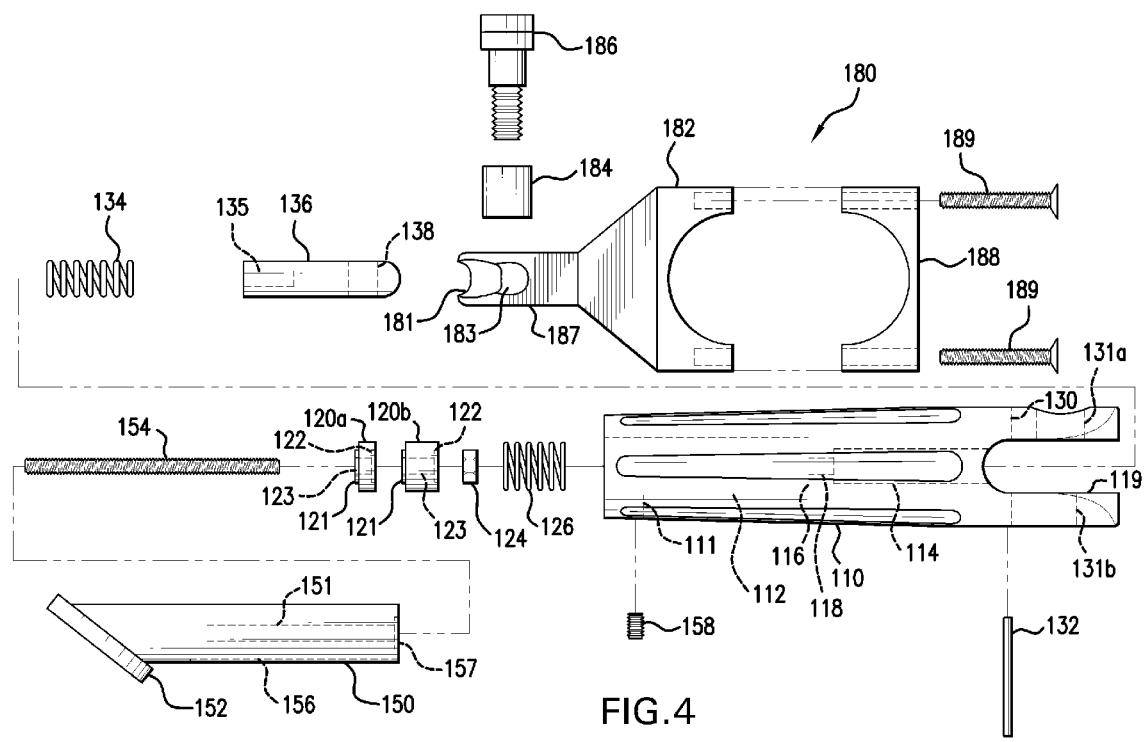
FIG. 4 is an exploded view of the present invention, illustrating the various components thereof.

Referring to FIG. 4, there is shown in exploded view component elements of an exemplary embodiment of the present invention. As is shown in the Figure, fixed kickstand body 110 has formed therein a first longitudinal chamber 112 and a second longitudinal chamber 114. The two chambers 112, 114 are separated by support wall 116, which has a coupling aperture 118 longitudinally formed therein.

At a proximal end of fixed body 110, there is formed pivot slot 119, which allows the fixed body 110 to be rotated about pivot 185. Additionally at the proximal end of fixed body 110, there is formed laterally thereto pivot screw hole 131a, 131b for accepting pivot screw 186 in forming the pivot 185.

Additionally at the proximal end of fixed body 110, there is formed laterally thereto pivot screw hole 131 for accepting pivot screw 186 in forming the pivot 185.

Fixed body 110 has further formed therein a lateral pin hole 130 for accepting a pin 132. Pin 132 fixes detent catch 136 in position, as will be discussed below.

At the distal end of fixed body 110, there is formed a set screw hole 111 for accepting a set screw 158. As will be discussed in paragraphs that follow, set screw 158 fixes extendable leg 150 in proper rotational orientation.

Extendable leg 150 includes support foot 152 attached at a distal end thereof. As previously described, certain embodiments of the present invention provide that support foot 152 be integrally formed on extendable leg 150 in single piece formation. As previously stated, support foot 152 is attached at a predetermined angle with respect to extendable leg 150.

A threaded hole 151 is longitudinally formed at a proximal end of extendable leg 150 for receiving a connecting rod 154. Additionally, at the proximal end of extendable leg 150, there is formed a recess 157 for accepting an annular boss 121 of a spacing element 120a–120e.

In certain embodiments of the present invention, clamping means 180 includes a clamp body 182 and a clamp face 188. As is known in the art, such a clamp receives a frame member or other supporting structure between the clamp body 182 and the clamp face 188 and pressure is applied to the structure in a conventional manner via clamp screws 189. As previously stated, attachment to the vehicle through other means does not affect or limit the unique features of the present invention. Clamping means 180 is an example of a wide variety of vehicle attaching means.

As shown in FIG. 4, clamping means further includes a narrowed pivot tongue 187 having formed thereon one or more detent position stops 183 interconnected by a detent guide groove 181. The guide groove 181 and position stops 183 receive a distal end of a detent catch 136 which allows the retention of the kickstand in the parking and stowed positions.

Clamp body 182 is coupled to fixed kickstand body 110 at pivot 185 via pivot screw 186. Bushing 184 is provided at the pivot 185 for providing smooth motion between pivot screw 186 and pivot tongue 187. Pivot tongue 187 is inserted into pivot slot 119 and is retained therein by passing pivot screw 186 through screw hole 131a, through the pivot tongue 187 and bushing 184, and then threadedly engaged in the screw hole 131b on the opposite side of pivot slot 119.

In certain embodiments of the present invention, connecting rod 154 is threadedly engaged in extension leg coupling hole 151. A plurality of spacing elements 120a–120e are selected to provide the desired length of extension. As is shown in the Figure, the spacing elements may be of different sizes so that the proper overall kickstand length may be easily established. In certain embodiments, each of the spacing elements 120a–120e has formed thereon an annular boss 121 which is received in recess 122 of an adjacent spacer. Extension leg 150 has formed thereon recess 157 for receiving the annular boss 121 of a spacer adjacent thereto. This arrangement allows the spacers to be interlocked, thereby providing lateral strength to the extension. The plurality of spacing elements 120a–120e may be locked into place via locking nut 124 threadedly engaged with connecting rod 154. Alternatively, one or more of the spacers 120a–120e may include a threaded portion in a longitudinal through-hole 123 thereof for threadedly engaging with a corresponding threaded portion of connecting rod 154.

In the exemplary embodiment of FIG. 4, extension leg 150 is coupled to main body 110 via connecting rod 154. Once the connecting rod has been fitted with the appropriate number of spacing elements 120a–120e, and the spacing elements have been locked in position via locking nut 124, a cushion spring 126 is placed adjacent to the stack of spacing elements 120a–120e. Connecting rod 154 is then inserted through aperture 118. On the opposite side of support wall 116, a detent spring 134 is placed on connecting rod 154. Detent catch 136 is inserted into internal chamber 114 and is retained in position by passing pin 132 through guide slot 138. As pin 132 also passes through main body 110 via pin holes 130, detent catch 136 is prevented from rotating. Connecting rod 154 is then threadedly engaged in threaded hole 135 of catch 136. When properly assembled, a slight amount of compression will be felt by cushion spring 126 between support wall 116 at one end thereof and the plurality of spacing elements 120a–123e at the other end thereof. Extension leg 150 is then rotated so as to align groove 156 longitudinally formed therein with set screw 158 threadedly inserted in set screw hole 111. Set screw 158 is then rotated until one end thereof is received in slot 156. This arrangement serves to prevent extension leg 150 from rotating during operation, while allowing relative longitudinal movement between fixed body 110 and extension leg 150.

Figure 5:
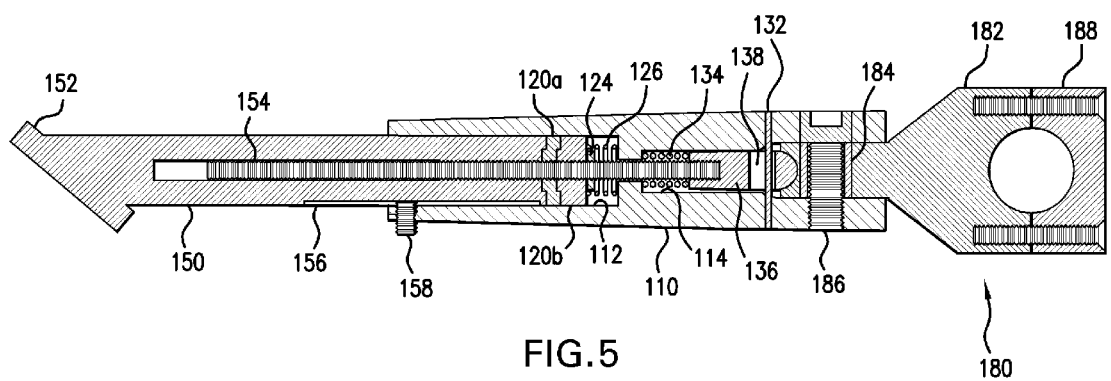
FIG. 5 is a cross-sectional view of an assembled kickstand of the present invention; and, FIGS. 6A–6B are illustrations of the operation of an exemplary kickstand of the present invention and the locking mechanism thereof.

FIG. 5 illustrates in cross-sectional view the assembled exemplary kickstand of the present invention. It is to be noted that the extension provided by spacing elements 120a–120b is fully supported through contiguous peripheral contact with the walls of inner chamber 112. It should be apparent to the skilled artisan that this support combined with the interlocking of the spacing elements 120a–120e, with both adjacent spacers and with extension leg 150, provide enhancement of strength to extension of the inventive kickstand.

Figure 6A:
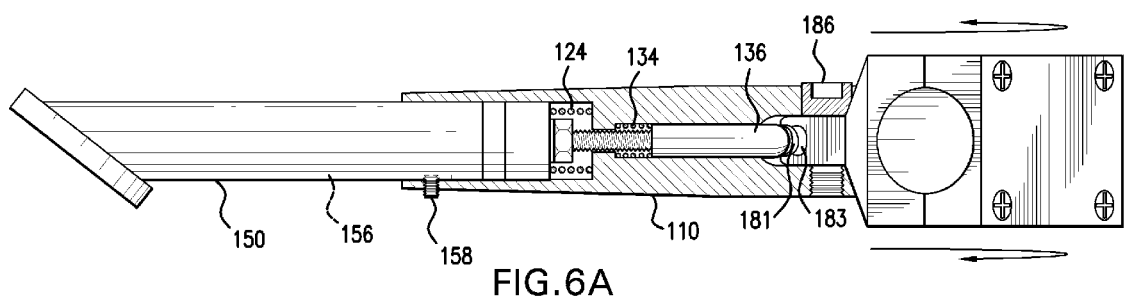

The internal locking feature of the present invention may be explained with reference to the exemplary embodiment thereof as shown if FIGS. 6A–6B. FIG. 6A depicts the kickstand partially rotated into the parking position. As is shown in the Figure, spring 124 is expanded as detent catch 136 is positioned in detent groove 181, which, in certain embodiments, is less recessed than a detent stop, such as stop 183. Correspondingly, detent spring 134 is compressed as detent catch 136 is forced away from the pivot screw 186.

Figure 6B:
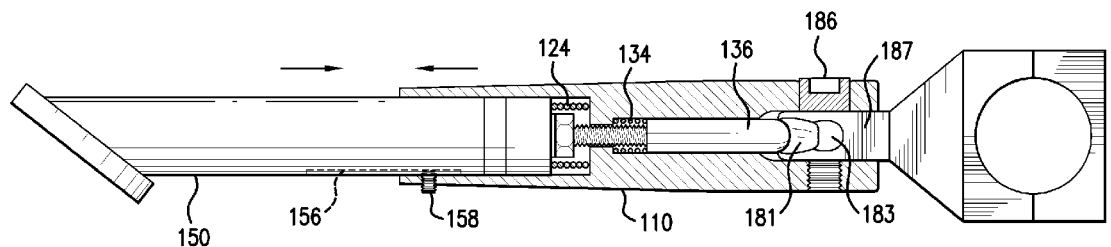

When the kickstand is in the parking position, as is shown in FIG. 6B, detent catch 136 is in the relatively deeper detent stop corresponding to the parking position (not shown). Thus, spring 134 expands and spring 124 is compressed. The weight of the vehicle, when propped by the kickstand, establishes forces therein, as indicated by the arrows, which reinforce the locking mechanism provided by the detent catch 136 in the parking position detent stop. The forces act to drive the extendable leg 150 further into the fixed body 110, which is mechanically coupled to the pivot tongue 187, which itself is coupled to the vehicle. As more weight is applied to the kickstand, greater force is applied between the detent catch 136 and the parking position detent stop. The force prohibits the rotation of the kickstand out of the parking position for as long as the weight is applied.

The above description is illustrative and not restrictive. Many variations, alternatives and modifications will be apparent to those of skill in the art upon review of this disclosure. For example, the means by connecting the extendable leg with the main body of the kickstand may be integrally formed on one or more elements thereof. The scope of the invention should, therefore, be determined with reference to the appended Claims along with their full scope of equivalence and not with reference to the above description.

What is claimed is:

1. An adjustable kickstand for propping a vehicle comprising:
    a fixed kickstand body having a first internal chamber at a proximal end thereof and a second internal chamber at a distal end thereof, said first chamber separated from said second chamber by a support wall having formed therein a longitudinally extending aperture;
    an extendable leg having a proximal end thereof slidably received against a bias in said second chamber, a distal end of said extendable leg extending from said second chamber;
    a pivot having a fixed pivot member and a rotatable pivot member, said rotatable member including a detent catch, a distal end of said detent catch engaging with at least one recessed detent stop formed on said fixed pivot member; and,
    a connecting rod mechanically coupled to said extendable leg and extending through said aperture in said support wall into said first internal chamber, said connecting rod being mechanically coupled to said detent catch.

2. The adjustable kickstand as recited in claim 1 further including a leg extension of a predetermined length on said proximal end of said extendable leg.

3. The adjustable kickstand as recited in claim 2, wherein said leg extension includes a plurality of spacers.

4. The adjustable kickstand as recited in claim 3, wherein at least a portion of said connecting rod is threaded.

5. The adjustable kickstand as recited in claim 4, wherein said spacers are held in adjacent contact with said proximal end of said extendable leg by a lock nut threadedly engaged with said threaded portion of said connecting rod.

6. The adjustable kickstand as recited in claim 4, wherein said spacers are threadedly engaged with said threaded portion of said connecting rod.

7. The adjustable kickstand as recited in claim 3, wherein said leg extension is mated in an interlocking arrangement with said extendable leg so as to prohibit relative lateral motion therebetween.

8. The adjustable kickstand as recited in claim 7, wherein said plurality of spacers are mated one with another in an interlocking arrangement so as to prohibit relative lateral motion therebetween.

9. The adjustable kickstand as recited in claim 1, wherein an end of said connecting rod is threaded, said detent catch being threadedly engaged at a proximal end thereof with said connecting rod.

10. The adjustable kickstand as recited in claim 1, wherein said bias is provided by a compression spring in said second chamber.

11. An adjustable kickstand comprising:
    a first elongated member having a first internal chamber longitudinally formed therein, said chamber having a cross-sectional inner radius and an anterior wall;
    a second elongated member having a cross-sectional outer radius being smaller than said cross-sectional inner radius of said first chamber, wherein a proximal end of said second member is inserted into said first chamber and detachably coupled to said first member, said proximal end has a recess formed therein;

a first resilient member inserted into said first chamber; and, at least one spacing member interposed between said first resilient member and said proximal end of said second member, said least one spacing member being formed with a protrusion extending from a first end thereof for insertion into said recess of said second elongated member to prevent lateral movement between said spacing member and said second elongated member, wherein said first resilient member is in simultaneous adjacent contact with said anterior wall and said at least one spacing member when the second member is coupled to said first member and extending therefrom by a predetermined length.

12. The adjustable kickstand as recited in claim 11, wherein said first member is coupled to said second member by a connecting rod.

13. The adjustable kickstand as recited in claim 12, wherein said connecting rod is threaded, said second member having longitudinally formed therein a threaded hole, said connecting rod threadedly engaged with said second member.

14. The adjustable kickstand as recited in claim 13, wherein said anterior wall has formed therein a longitudinally extending aperture, said connecting rod passing through said aperture.

15. The adjustable kickstand as recited in claim 14, further including a detent at a pivot at a proximal end of said first member, said detent including a catch mounted in a second chamber of said first member, said second chamber on a side of said anterior wall opposing said first chamber, said catch having formed at a proximal end thereof a threaded hole for threadedly engaging said connecting rod extending through said aperture in said anterior wall.

16. The adjustable kickstand as recited in claim 13, wherein said at least one spacing member has a through-hole longitudinally formed therein, said connecting rod passing through said through-hole and extending through said aperture in said anterior wall.

17. The adjustable kickstand as recited in claim 11, wherein said spacing member has formed in an opposing second end thereof a recess for optionally receiving said protrusion of an adjacent spacing member so as to prevent lateral movement between said spacing member and said adjacent spacing member.

18. The adjustable kickstand as recited in claim 16, wherein said through-hole is threaded so as to be threadedly engaged with said connecting rod.

19. The adjustable kickstand as recited in claim 16, wherein said at least one spacing element is held in adjacent contact with said proximal end of said second member by a locking nut threadedly engaged with said connecting rod.

* * * * *